US007540205B2

(12) United States Patent
Nelson et al.

(10) Patent No.: US 7,540,205 B2
(45) Date of Patent: Jun. 2, 2009

(54) ELECTRONIC PIPETTOR

(75) Inventors: Gary E. Nelson, Hollis, NH (US); George P. Kalmakis, Gloucester, MA (US); Joel Novak, Sudbury, MA (US); Kenneth Steiner, Sudbury, MA (US); Jonathon Finger, Arlington, MA (US); Richard Cote, Bolton, MA (US)

(73) Assignee: Viaflo Corp., Hudson, NH (US)

( * ) Notice: Subject to any disclaimer, the term of this patent is extended or adjusted under 35 U.S.C. 154(b) by 0 days.

(21) Appl. No.: 11/856,231

(22) Filed: Sep. 17, 2007

(65) Prior Publication Data

US 2009/0071266 A1 Mar. 19, 2009

(51) Int. Cl.
*G01N 1/00* (2006.01)

(52) U.S. Cl. .................................................. 73/864.11

(58) Field of Classification Search ...................... None
See application file for complete search history.

(56) References Cited

U.S. PATENT DOCUMENTS

| | | | | |
|---|---|---|---|---|
| 3,915,651 | A | 10/1975 | Nishi | |
| 4,399,711 | A | 8/1983 | Klein | |
| 4,567,780 | A | 2/1986 | Oppenlander et al. | |
| 4,821,586 | A | 4/1989 | Scordato et al. | |
| 4,905,526 | A | 3/1990 | Magnussen, Jr. et al. | |
| 5,090,255 | A | 2/1992 | Kenney | |
| 5,187,990 | A | 2/1993 | Magnussen, Jr. et al. | |
| 6,090,348 | A | 7/2000 | Steele et al. | |
| 6,170,343 | B1 * | 1/2001 | Conley et al. | 73/864.18 |
| 6,254,832 | B1 | 7/2001 | Rainin et al. | |
| 6,299,841 | B1 | 10/2001 | Rainin et al. | |
| 6,428,750 | B1 | 8/2002 | Rainin et al. | |
| 6,841,129 | B2 | 1/2005 | Braun et al. | |
| 7,046,230 | B2 | 5/2006 | Zadesky et al. | |
| 2002/0095998 | A1 * | 7/2002 | Kriz et al. | 73/864.18 |
| 2005/0118069 | A1 | 6/2005 | Solotareff et al. | |
| 2007/0152983 | A1 | 7/2007 | McKillop et al. | |

FOREIGN PATENT DOCUMENTS

| | | | |
|---|---|---|---|
| DE | 94 06 304 | U1 | 6/1994 |
| WO | 2005/079989 | A1 | 9/2005 |
| WO | 2006/028399 | A1 | 7/2007 |

OTHER PUBLICATIONS

“Pipetman Concept”, Gilson, Aug. 2005.
International Search dated Jan. 29, 2009.

* cited by examiner

*Primary Examiner*—Robert R Raevis
(74) *Attorney, Agent, or Firm*—Andrus, Sceales, Starke & Sawall, LLP

(57) ABSTRACT

A hand-held electronic pipettor is designed particularly to be programmed and operated with one hand for the convenience of the user. It uses a capacitance touchpad control for programming, and a separate run button for the operating mode. Internal components are located so that the center of gravity of the pipettor is located within the palm of the user. Flash memory stores an empirically derived table that correlates aspiration volume to motor steps and a separate empirically derived table the correlates dispensing volumes to motor steps.

7 Claims, 4 Drawing Sheets

FIG. 7

300μl UPLOAD

| 36A STOP | 36B ASPIRATE | 36C DISPENSE | 36D VOLUME |
|---|---|---|---|
| 0 | 0 | 0 | 0 |
| 1 | 2 | 2 | 5 |
| 2 | 4 | 3 | 10 |
| 3 | 6 | 5 | 15 |
| 4 | 8 | 6 | 20 |
| 5 | 10 | 8 | 25 |
| 6 | 12 | 10 | 30 |
| • | • | • | • |
| • | • | • | • |
| • | • | • | • |
| • | • | • | • |
| 25 | 44 | 40 | 125 |
| 26 | 46 | 42 | 130 |
| 27 | 48 | 43 | 135 |
| • | • | • | • |
| • | • | • | • |
| • | • | • | • |
| • | • | • | • |
| 594 | 958 | 952 | 2970 |
| 595 | 960 | 954 | 2975 |
| 596 | 961 | 955 | 2980 |
| 597 | 963 | 957 | 2985 |
| 598 | 964 | 958 | 2990 |
| 599 | 966 | 960 | 2995 |
| 600 | 968 | 962 | 3000 |

ELECTRONIC PIPETTOR

FIELD OF THE INVENTION

The invention relates to improvements in hand-held electronic pipettors.

BACKGROUND OF THE INVENTION

The use of hand-held electronic pipettors is widespread in clinical and research laboratory applications. Electronic pipettors are typically controlled by small microprocessors that are located within in the pipettor housing. The microprocessors are usually programmed through the use of user controls on the pipettor itself. Many electronic pipettors have a small screen display as well. Users can program the pipettor to aspirate a volume of liquid reagent or sample and dispense the aspirated volume or a series of aliquots in successive dispensing operations. Programmable electronic pipettors can also be configured to do more complex operations such as mixing in a pipettor tip, etc.

The electronics industry has seen many advances in recent years. For example, small-scaled LCD displays with improved clarity and enhanced color graphics capabilities, improved processing and memory capabilities, wireless communication devices, etc. are all prevalent. To date, however, it has been difficult to take advantage of many of these advancements in hand-held pipettors. Hand-held electronic pipettors, by their very nature, need to be compact and comfortable in the palm of the hand, yet provide ample room for the motor, the piston and cylinder assembly, and the ejection mechanism, as well as the programmable electronics and a power supply such as a rechargeable battery. An objective of the invention is to provide a configuration for a hand-held electronic pipettor that is able to physically accommodate recent electronic advancements yet meet the above described design requirements.

Another objective of the invention is to provide a hand-held electronic pipettor with improved pipetting accuracy. Pipetting accuracy is especially important when working with small volumes, such as 1 or 2 μl aliquots, however, accuracy can be difficult to attain when pipetting such small aliquots. Difficulties arise not only because of mechanical imprecision of the pipettor components, but also because liquid surface tension issues. Inherently, there are normally differences between forces acting on liquids being aspirated and forces acting on liquids being dispensed, and these differences can cause meaningful inaccuracies when pipetting small volumes.

SUMMARY OF THE INVENTION

In one aspect, the invention is a hand-held electronic pipettor that is designed particularly to be programmed and operated with one hand for the convenience of the user. More specifically, the pipettor has an elongated body adapted to be held in hand of the user with a finger hook on the rear side of the body. On the front side of the body there is a touch wheel control that is operated by the thumb of the user or with a finger from the hand not holding the pipettor. A user interface display is also located on the front side of the pipettor and is located preferably above the touch wheel control. The pipettor preferably comprises a microprocessor which is programmed with menu driven software for controlling information displayed on the user interface display and for programming the microprocessor to operate the pipettor. The user programs the pipettor using the touch wheel control. A run button is located on the front side of the pipettor body as well, and is located below the touch wheel control. The run button likewise is designed to be operated by the thumb of the user. The user activates the run button in order to run a procedure or the next step in the procedure that is programmed into the pipettor. The front side of the pipettor also preferably includes an ejector button to be operated by the thumb of the user. The ejector button is used to activate the ejection mechanism to remove pipette tips mounted to the tip mounting shaft on the pipettor. The ejector button is preferably located below the run button. In this manner, the touch wheel control, run button and ejector button can all be conveniently operated by the thumb of the user.

The preferred touch wheel control includes a circular touch pad that uses capacitance electronics to translate rotational movements of the thumb (or finger) into up and down cursor movements on the display, and an enter button located at the center of the circular touch pad. The circular touch pad also preferably includes four selector locations, namely a back button located at the top of the circular touch pad, right and left navigation buttons located on the right and left side of the circular touch pad, respectively, and a purge button located at the bottom of the circular touch pad. The back button allows the user to conveniently return to the previous screen or menu selection. The right and left navigation buttons allow the user to navigate via right or left menu prompts. The purge button allows the user to voluntarily stop the procedure and purge the pipettor, i.e., a full dispense and blow out, in order to purge the system to start another procedure. In accordance with the invention, each of these controls can be implemented conveniently using the thumb or finger of the user.

In accordance with another aspect of the invention, the pipettor is designed so that the center of gravity of the pipettor is located within the palm of the hand of the user holding the pipettor with their index finger wrapped around the housing underneath the finger hook located on the rear housing. This provides the user with a comfortable feel, and promotes accuracy in the placement of the physical location of the pipette tip by the user. In order to accommodate the relatively large number of electrical components on the pipettor, it is desirable to use a battery that has relatively significant weight, size and electrical storage capacity. Thus, it is preferred to use a battery having an elongated cylindrical shape as is common, but not typically used in connection with electronic pipettors. The housing is designed to provide structural support for the internal components of the pipettor, including the motor, and the elongated rechargeable battery. In accordance with this aspect of the invention, it has been found that mounting the battery in the housing so that the top of the battery is above the height of the finger hook, and the motor is mounted at a height substantially below the battery will locate the center of gravity of the pipettor in the palm of the hand of the user, and will also otherwise allow for the appropriate placement of internal pipettor components within the pipettor housing in a compact manner. In addition, the pipettor housing is designed with an internal vertical structure or wall which provides a compartment for the rechargeable battery, as well as preferably another compartment for an optional wireless communication chip. These compartments are accessible to the user if the user removes the rear housing, but the vertical structure isolates other electrical components from the user thereby protecting those other components, such as the color screen display, the capacitance circular touch pad, and a circuit board operating the pipettor.

In accordance with another aspect of the invention, it is preferred that the pipettor be equipped with at least one megabyte of flash memory, i.e., electrically erasable programmable read-only memory. The flash memory is helpful for many reasons, including software storage.

In accordance with another aspect of the invention, the invention involves the use of an aspiration look-up table, preferably located in flash memory, to determine the number of motor steps (or half steps) necessary to aspirate a selected aspiration volume. The motor step values in the aspiration table are preferably determined empirically to account for any aspiration accuracies in the pipettor, as is known in the art. To aspirate a volume of liquid, the user selects the aspiration volume, then a translator in flash memory determines an index value to which that aspiration volume corresponds. The index value is then correlated to the number of motor steps empirically determined to aspirate the appropriate amount of liquid. From the home position the motor retracts the piston the determined number of motor steps (or half steps) in order to aspirate the selected aspiration volume into the disposable pipette tip mounted on the pipettor.

In accordance with another aspect of the invention, when a user desires to dispense multiple aliquots, the pipettor uses a separate dispensing look-up table to determine the appropriate number of motor steps necessary to dispense the selected (or calculated) aliquot volume. The motor step values in the dispensing look-up table are empirically determined to account for dispensing inaccuracies. It has been found that the number of steps corresponding to aspirating a certain value is typically somewhat different than the number of steps for dispensing the same value, and therefore using separately developed empirical tables for as dispensing and aspirating can lead to significant improvements in dispensing accuracy especially when dispensing multiple aliquots of small volumes.

Preferably, the user can separately calibrate the aspiration look-up table and/or the dispensing look-up table in the field by shifting the values in the tables independently after using conventional calibration procedures.

Other features of the invention may be apparent to those skilled in the art upon reviewing the following drawings and description thereof.

BRIEF DESCRIPTION OF THE DRAWINGS

FIG. 7 illustrates an aspiration look-up table and a dispensing look-up table in accordance with the preferred embodiment of the invention.

DETAILED DESCRIPTION OF THE INVENTION

Figure 1:
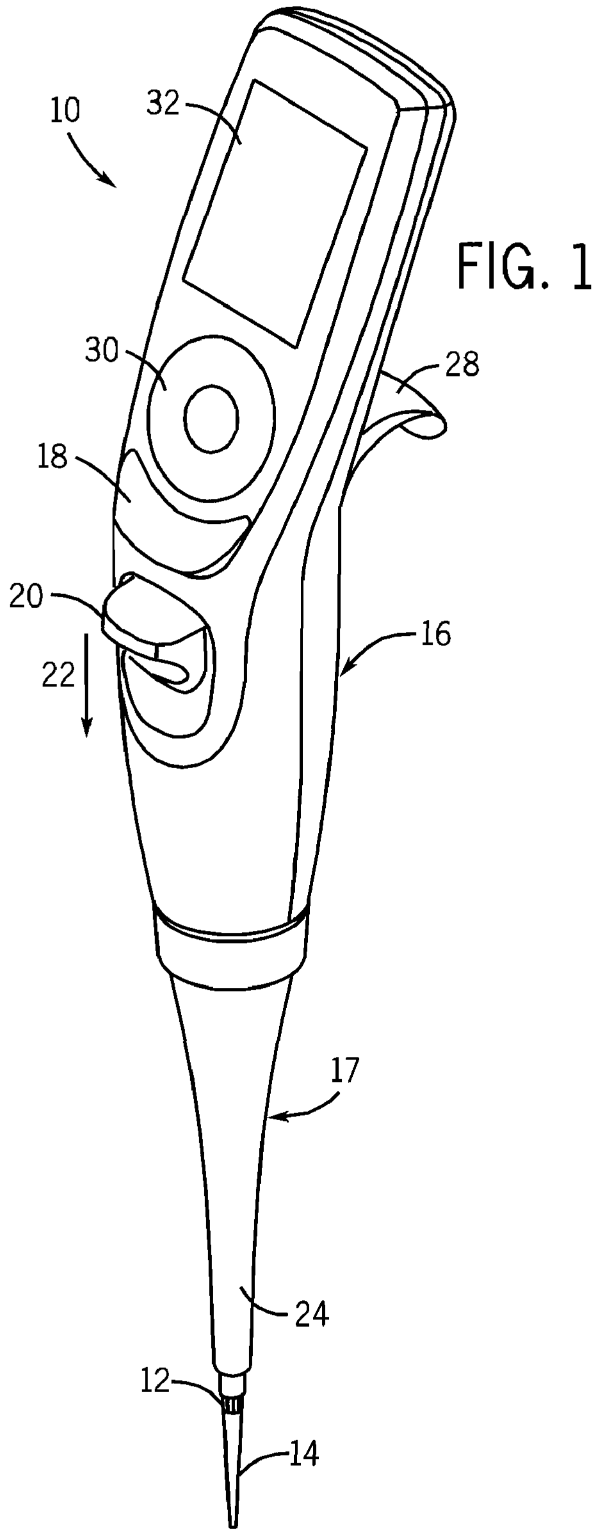
FIG. 1 a perspective view of a hand-held electronic pipettor constructed in accordance with a preferred embodiment of the invention.
Figure 2:
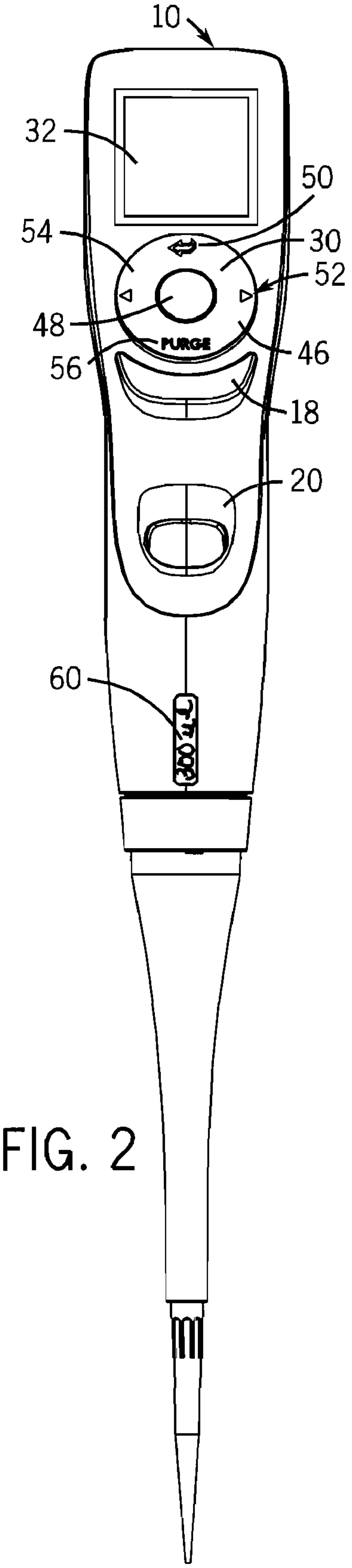
FIG. 2 is a front elevation view of the pipettor shown in FIG. 1.
Figure 3:
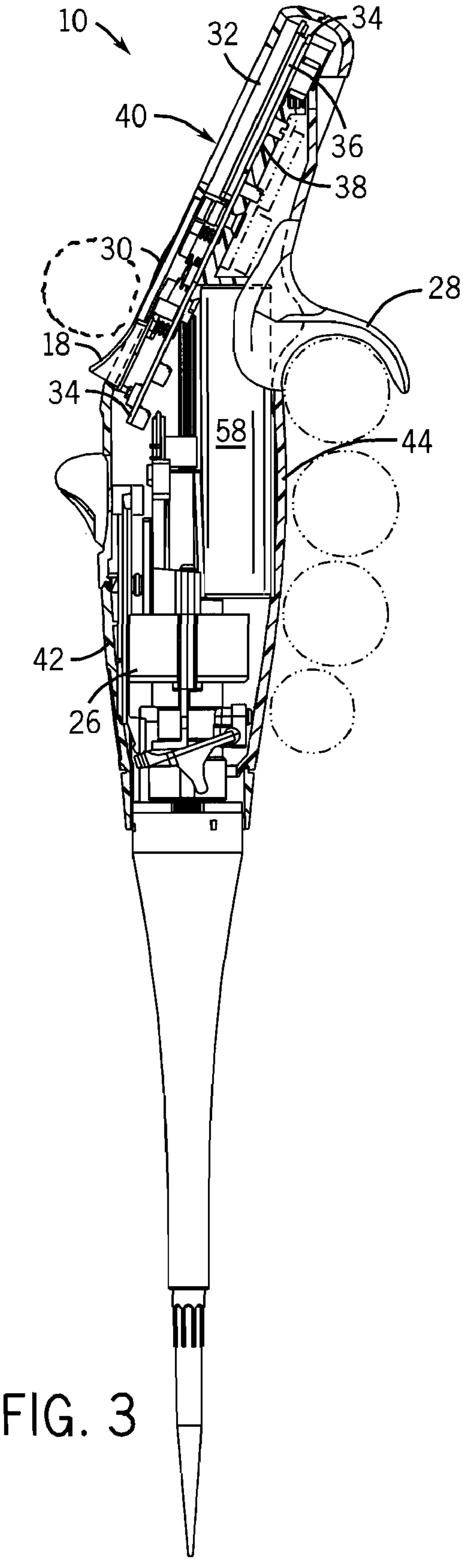
FIG. 3 is a side elevation view of the pipettor shown in FIGS. 1 and 2 with an upper handle portion of the housing broken away to display internal components.

FIGS. 1-6 show a single channel pipettor 10 constructed in accordance with a preferred embodiment of the invention. While the embodiment shown is a single channel pipettor 10, it should be understood that many aspects of the invention may apply to multi-channel pipettors as well. The single channel pipettor 10 shown in the drawings is a hand-held electronic pipettor which is programmable by the user to aspirate and dispense liquid samples or reagents. The hand-held pipettor 10 includes a mounting shaft 12 onto which a disposable pipettor tip 14 is mounted as is known in the art. Although not shown in the drawings, the pipettor 10 includes an aspiration cylinder and a piston that is driven by motor 26 (see FIGS. 3-6) as will be explained in more detail below. The pipettor 10 has an elongated body consisting of an upper portion 16 and a lower portion 17. The aspiration cylinder and piston resides in the lower portion 17. A finger hook 28 is located on the rear side of the upper portion 16 of the pipettor 10. The upper portion 16 of the pipettor 10 is adapted to be held in the hand of a user, in the user's palm, with the user's index finger residing against the bottom surface of the finger hook 28 and the user's thumb available to operate controls on the front side of the pipettor, as shown in FIG. 3.

The front side of the pipettor 10 includes a touch wheel control 30, a run button 18 located below the touch wheel control 30, an ejector button 20 located below the run button 18, and a user interface display 32 located above the touch wheel control 30. As can be seen in FIG. 1 and in particular in FIG. 3, each of the touch wheel control 30, run button 18, and ejector button 20 can be operated conveniently by the thumb of a user, thereby enabling convenient one-handed programming and operation. If desirable, the user can also conveniently use the touch wheel control to program the pipette with a finger on the opposite hand. The touch wheel control 30 is used to control the pipettor 10, preferably in accordance with menu driven software controlling the information displayed on the user interface display 32 and providing an interface for programming the microprocessor to operate the pipettor 10. While not described in detail herein, the preferred features of the menu driven software are disclosed in copending patent application Ser. No. 11/856,232, filed on Sep. 17, 2007 and entitled "Pipettor Software Interface", which is assigned to the assignee of the present application and incorporated by reference herein. The run button 18 located below the touch wheel control 30 is actuated by the user after the pipettor 10 has been programmed in order to run aspiration and dispensing procedures. The ejector button 20 located below the run button 18 is actuated by the thumb of a user in the direction of arrow 22 to manually eject the disposable pipettor tip 14 from the pipettor 10. More specifically, downward movement of the ejector button 10 activates an ejector mechanism which pushes the ejector sleeve 24 downward against a spring bias to engage the top of the pipettor tip 14 and eject the tip 14 from the tip mounting shaft 12 on the pipettor 10. The preferred ejector mechanism is disclosed in copending U.S. patent application Ser. No. 11/856,193, filed on Sep. 17, 2007 and entitled "Pipettor Tip Ejection Mechanism", assigned to the assignee of the present application and incorporated herein by reference. The preferred configuration for the mounting shaft 12 and the disposable pipettor tip 14 are disclosed in co-pending U.S. patent application Ser. No. 11/552,384, entitled "Locking Pipette Tip and Mounting Shaft" which is assigned to the assignee of the present application and incorporated herein by reference. It should be understood, however, that the features of the present invention need not be limited to the preferred ejection mechanism or the preferred configuration for the mounting shaft and pipettor tips disclosed in the above-referenced, co-pending patent applications. In the preferred embodiment, the ejection mechanism is driven manually by the user actuating the ejector button 20. The run button 18 and the touch wheel control 30, on the other hand, provide electrical control or programming inputs.

Referring in particular to FIG. 3, a circuit board 34 contains circuitry for the user interface display 32, the touch wheel control 30, and the run button 18, as well as a microprocessor 38, and flash memory 36, and circuitry for driving the stepper motor and for battery charging and power management.

Preferably, the pipettor 10 includes at least one megabyte of electrically erasable programmable read-only memory, i.e., flash memory 36. Suitable flash memory 36 is available, e.g., from Atmel Corporation. The microprocessor 38 can be any suitable microprocessor, e.g., from Texas Instruments Inc. The microprocessor 38 is used for programming functions and data storage, in combination with the flash memory 36. The microprocessor 38 and the flash memory 36 allow ample memory storage for programs, calibration information, screen saver images, etc. The flash memory 36 stores information even if power is lost. Preferably, the pipettor includes a reset button which will reset the RAM on the pipettor 10, i.e., the microprocessor 38, but programs stored in the flash memory 36 are maintained. The use of flash memory 36 allows storage of larger programs and data, as well as the ability to reprogram or re-flash new software for future enhancements. Flash memory 36 normally has good kinetic shock resistance whether powered or not. Moreover, as discussed below, use of the flash memory 36 allows the use of separate aspiration and dispensing lookup tables that can be programmed into flash memory to more accurately correlate aspirating and dispensing volumes to motor movement for specific pipettor models. The microprocessor 38, as mentioned, contains menu driven software which controls the operation of the pipettor 10 in accordance with either canned or custom procedures and user input.

The preferred user interface display 32 is a color 128 by 128 pixel LCD display, such as is available from Truly Semiconductors Limited, headquartered in Hong Kong. The size of the screen for the preferred LCD display is 1.5 inches across the diagonal. It has been found that such a display provides clarity and ease of programming to the user. Further, using the color display allows the software to be color coded, as described in the above-incorporated co-pending patent application entitled “Pipettor Software Interface”. The improved clarity of the display 32 allows the pipettor 10 to provide more complete information on the display 32, such as eliminating the need for abbreviations on the display and/or providing a meaningful help function on board the pipettor. The display 32 provides interactive user interface output for all pipettor programming actions, indicators and help screens. Navigation of the menus displayed on a user interface display 32 is accomplished using the touch wheel control 30. The user interface display 32 is mounted to the upper end of the circuit board 34 and is attached to the upper portion 16 of the pipettor 10, such that the screen of the display 32 can be seen through an opening 40 in the pipettor housing.

Figure 4:
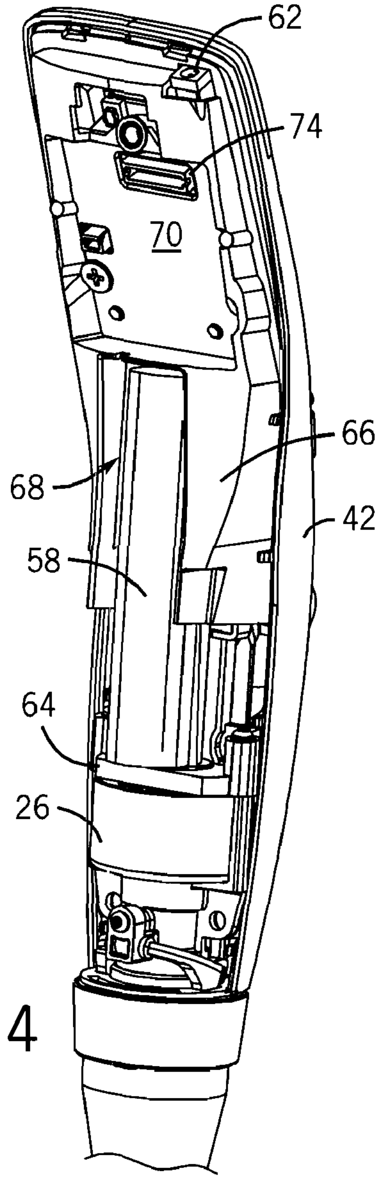
FIG. 4 is a rear perspective view of the pipettor shown in FIGS. 1-3 with a rear housing member removed in order to show components accessible from the rear of the pipettor when the rear housing member is removed.
Figure 5:
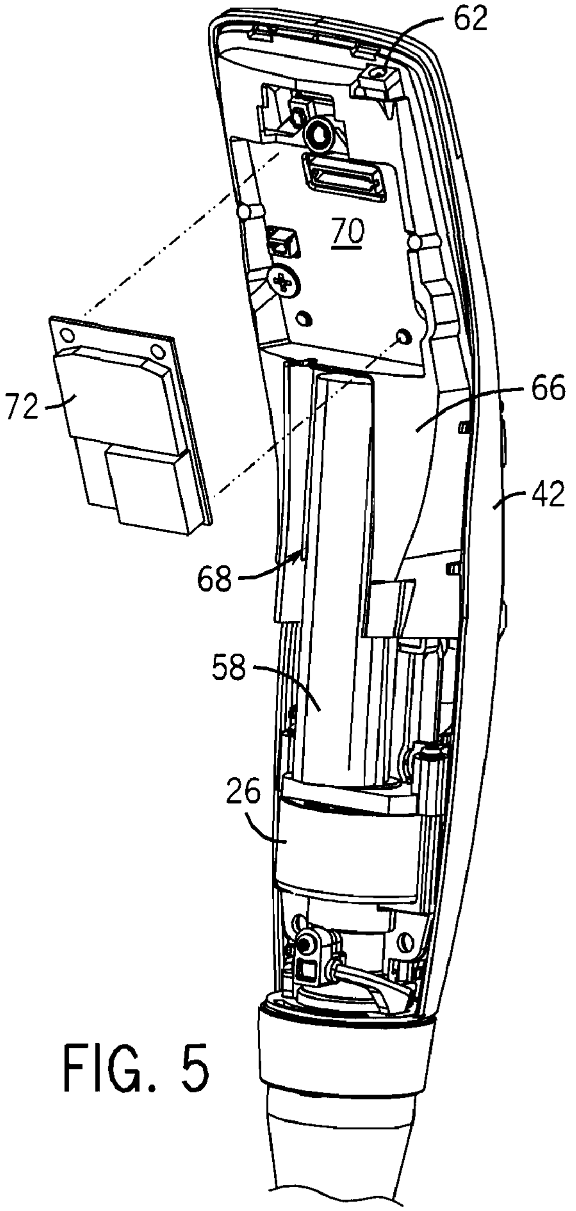
FIG. 5 is a view similar to FIG. 4 which also schematically illustrates the insertion of a wireless communications chip into an insolated chamber accessible from the rear of the pipettor upon removing the rear housing member.
Figure 6:
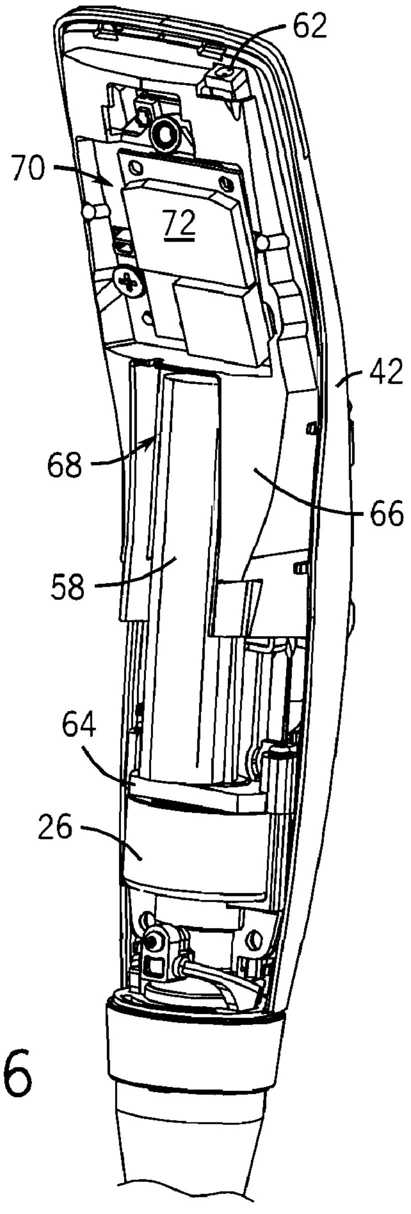
FIG. 6 is a view similar to FIG. 5 showing the wireless communication chip installed.

The upper portion 16 of the pipettor includes a front housing member 42 and a rear housing member 44. The front housing member 42 and the rear housing member 44 are attached together to enclose the internal components of the pipettor 10. FIG. 3 illustrates in cross-section the front housing member 42 and the rear housing member 44 with the enclosed internal components. In FIGS. 4, 5 and 6, the rear housing member has been removed. The circuit board 34 (containing the circuitry for the user interface display 32, the touch wheel control 30, the run button 18, the microprocessor 38, the flash memory 36, and circuitry for driving the stepper motor and for battery charging and power management) is attached to the upper portion of the front housing member 42, preferably using screws or the like. As mentioned, the front housing member 42 has an opening 40 through which the screen for the user interface display 32 can be viewed by the user.

As is known in the art, the preferred touch wheel control 30 includes a capacitance circular touch pad 46 and a central enter or “OK” button 48, see FIG. 2. The circular touch pad 46 comprises a plastic molded cover with a flexible printed circuit board glued to its underside. The flexible printed circuit board is made of Kapton® polyimide film with printed copper etches on the backside. The printed copper etchings on the back side of the flexible material define regions around the circular touchpad 46 as is generally known in the art. The printed flexible circuit is electrically connected to a devoted microprocessor (Quantum 4k) which is designed to detect the capacitance of a finger or thumb in one or more regions of the circular touch pad 46. As is also known in the art, the touch wheel control 30 is programmed to translate relative rotational movement into up and down scrolling movements on the display screen 32, for example, clockwise motion of the thumb scrolls menu downward whereas counterclockwise motion of the thumb scrolls the menu upward. The plastic cover for the touchpad 46 also has four downwardly extending protrusions (not shown in the drawings) spaced equally around the circular touchpad 46. There are six switches also mounted to the main circuit board 34, four corresponding to the location of the downward protrusions on the circular touch pad 46, one corresponding to the location of the enter button 48, and one corresponding to the position of the run button 18. Control signals are sent to the microprocessor 38 when the user presses any one of these switches. With respect to the switches activated by the circular touchpad 46, the microprocessor 38 preferably includes software which uses information from the capacitance sensor to ensure that a proper control signal sent to the microprocessor 38 in the event that more than one switch is activated when the user depresses the touchpad 46. In the software, pressing the enter button normally signals to select the value highlighted on the display 32 per the rotational movement detected on the circular touchpad 46. The four selector locations on the circular touch pad 46 are preferably labeled with symbols on the circular touch pad 46, as shown in FIG. 2. The top of the circular touch pad 46 shows a “go back” symbol 50 which serves as a back button for menu selections. When a user presses and holds the back button on the circular touch pad 46, the menu on the display will go back to the previous menu or information displayed. The circular touch pad 46 also includes right and left navigation buttons 52, 54, respectively. The user can navigate a right arrow menu prompt using the right navigation button 52, and a left arrow menu prompt by pressing the left navigation button 54. The circular touch pad 46 also includes a “purge” symbol 56. When the user presses and holds the purge button 56, the pipettor 10 will empty. In other words, the pipettor 10 is programmed to do a complete dispense and blowout when the user presses and holds the purge button 56. More specifically, it is preferred that pressing the purge button 56 will display a prompt on the display 32 for the user to press the run button 18 to proceed with purging. Normally, after completing the final dispense in a typical dispense cycle, a blowout will be initiated automatically upon pressing of the run button 18. As is known in the art, the pipettor 10 should be held with the tips out of the liquid to complete the blowout and avoid aspirating liquid back into the tip(s). Alternatively, the run button 18 can be held in the liquid to perform the blowout with the pipettor returning home upon releasing run button 18. The “purge” button 56 allows a user to prematurely end the procedure, such as would be the case if the user wanted to start over.

As mentioned, there are four switches associated with the circular touch pad 46, one switch associated with the enter or "OK" button 48, and one switch associated with the run button 18. Preferably, the switches associated with the circular touch pad control 46 and enter or "OK" button 48 are used for programming the pipettor, and the switch associated with the run button 18 is used to initiate pipetting protocols or pipetting steps. For a more complete description of the preferred embodiment, refer to the incorporated co-pending patent application entitled "Pipettor Software Interface," filed on even date herewith.

As mentioned, the motor 26 is preferably a stepper motor controlled by the microprocessor 38. The preferred stepper motor 26 is DC powered, and capable of being controlled in full steps or half steps. A suitable stepper motor can be purchased from Haydon Switch and Instrument, Waterbury Conn. The preferred motor drives at 0.002 inches per each full step and 0.001 inches per each half step. Preferably, the microprocessor 38 is capable of supplying DC power the stepper motor 26 via pulse width modulation in order to control the average current provided to the motor. Pulse width modulation provides several advantages. First, pulse width modulation can be used to control the rate of acceleration, which in turn smoothes the acceleration and deceleration per each motor step. This prevents the motor from over shooting the desired position and also minimizes mechanical oscillation of the motor. In addition, slower acceleration at start up helps to overcome binding forces by rubber seals in a smooth fashion so there is no need to home after the pipette has been sitting idle, at least in single channel pipettors where the sealing binding forces are relatively small compared to multichanneled pipettors. In addition, pulse width modulation can be used to reduce the current draw when desirable, which not only reduces energy consumption but also reduces heat generation. Further, it is preferred that the power management circuitry be designed to scavenge inductive energy in the motor back to the battery as is known in the art, to extend battery life. The characteristics of the preferred battery are discussed below.

As is known in the art, the stepper motor 26 provides rotational stepping or half stepping motion which is converted into axial motion of the piston within the aspiration and dispensing chamber. The full stroke movement of the preferred stepper motor is approximately 1.1 inches per second at top pipetting speed. However, it may be desirable in some circumstances to use a half stepping routine in order to improve pipetting accuracy. If higher pipetting speeds are desirable, it may be desirable to use half stepping at motor start up while the piston is released from binding its forces that have developed in seal areas in the pipettor 10, and then convert to a full stepping routine for faster speed once the motor 26 is moving, and finally convert back to a half-stepping routine as the motor 26 approaches the end of the movement in order for increased accuracy. On the other hand, in pipettors 10 using the preferred motor, it may be desirable to operate in half stepping mode completely. Preferably as mentioned, it may be desirable to limit acceleration to the top pipetting speed through the combination of pulse width modulation to limit current supply to the motor and using half step control perhaps in combination with full step control to ensure stable acceleration to top speed. Moreover, it may desirable to adjust the top pipetting speed, for example the user may have the capability of selecting between 10 top pipetting speeds as disclosed in the incorporated co-pending patent application titled "Pipettor Software Interface" filed on even date herewith. In that case, it is preferred that acceleration and deceleration tables be loaded into flash memory 36 for each speed.

Depending on the application, the pipettor 10 and the tips 14 are designed to operate over a preferred volume range, as is generally known in the art. For example, in a single channel pipettor 10 as shown in the Figures, it may be preferred to design the pipettor 10 to operate over a volume range of 0.5 to 12.5 μl, or a range of 5 to 125 μl, or a range of 10 to 300 μl, or a range of 50 to 1,250 μl, or a range of 100 to 5,000 μl. Multi channel pipettors would likely not be designed for the higher volumes, especially if the pipettor included a large number of channels, such as 16 channels. FIG. 2 shows a label 60 on the pipettor 10 for indicating the size of the pipetting volumes for which the pipettor is designed.

It is typical in the art to use a lookup table to correlate motor steps to pipetting volumes. In accordance with one aspect of the preferred embodiment of the invention, the pipettor 10 includes an aspiration lookup table that determines the number of motor steps necessary to aspirate a selected aspiration volume, and a separate dispensing lookup table that determines the number of motor steps necessary to dispense a selected or programmed volume. The values in the aspiration lookup table are determined empirically to account for aspiration inaccuracies in the pipettor 10, whereas the values in the dispensing lookup table are determined to empirically account for dispensing inaccuracies in the pipettor 10. This is particularly helpful because, as mentioned above, the forces acting on liquids being aspirated and forces acting on liquids being dispensed are quite different and this can have a substantial effect, especially when dealing with small aliquots. In addition, mechanical imprecision during aspiration is typically different than during the dispense cycle. Preferably, the aspiration and dispensing lookup tables reside in the flash memory 36. FIG. 7 illustrates portions of a data table containing data correlations for the translator, the aspiration look-up table 36B and the dispensing look-up table 36C for a 300 μl pipettor. The entire data table in FIG. 7 preferably resides in flash memory 36.

Referring to FIG. 7, in the preferred system, the pipettor 10 displays (or calculates from inputted data) a list of aspiration and dispensing volumes 36D on the display screen 32. For the 300 μl pipettor 10, the volumes are displayed in 0.5 μl increments. The volume listings 36D in FIG. 7 show these increments without the decimal point. The displayed volumes correspond to a numerical index, for example ranging from 1 to 1,000, or 1 to 1,200, although a smaller range such as 1-600 can be used for smaller sizes such as the illustrated 300 μl pipettor. The full range of index values 36A, for example 1-600 in FIG. 7 corresponds to the full stroke of the piston. Each index value 1-600 also corresponds to a motor half motor step (i.e., 0.001 inches) value for aspiration 36B and for dispensing 36C. The translator in flash memory 36 correlates the displayed (or calculated) volume 36D to a respective index value 36A. For aspiration, the index value 36A points to a position in an aspiration lookup table 36B which also resides in the flash memory 36. The aspiration lookup table 36B correlates the index value 36A to a corresponding retraction distance in terms of the number of motor steps (or half steps) necessary to aspirate the selected volume 36D. It is this number of motor steps (or half steps) that is input into the microprocessor 38, and which the microprocessor uses for operation. In a similar manner, the flash memory 36 also contains a dispensing lookup table 36C that correlates dispensing volumes 36D to an extension distance in terms of motor steps (or half steps) similar to that described above with respect to the aspiration lookup table, which the microprocessor 38 uses to control precise dispensing steps. The values in columns 36B and 36C for the 300 μl pipettor indicate the number of motor half steps. For neat pipetting, i.e., when the full amount of the aspirated liquid is to be dispensed, it is necessary only to use the aspiration look-up table 36B. On the other hand, the dispensing look-up table 36C is used, for example when dispensing multiple aliquots.

The translator index values 36A in flash memory 36 and the aspiration and dispensing lookup tables in flash memory 36 are determined separately for each pipettor model. The translator normally correlates the full range of pipettor volume to the index scale, for example 1 to 1,200 or 1-600 in the case of the 300 μl pipettor, although sometimes it may be desirable to use less than the full piston stroke. The aspiration lookup table 36B is preferably determined via empirical analysis for each pipettor model similar to the techniques used in the prior art such as Nishi U.S. Pat. No. 3,915,651 entitled "Direct Digital Control Pipettor," incorporated herein by reference. The output of the aspiration lookup table 36B, as mentioned, is the number of motor steps (or half steps) that is necessary to aspirate the displayed (or calculated) volume, based on empirical data that accounts for various inaccuracies in the pipettor 10, including mechanical inaccuracies and inaccuracies due to air pressure and surface tension effects, as well as any other inaccuracies. While the aspiration lookup table 36B is determined for each model, it can preferably be calibrated by the user from time to time using conventional laboratory calibration techniques and then by shifting the table 36B either upward or downward. With respect to multiple dispensing, the pipettor 10 preferably retracts the piston an amount for the overall volume of the liquid, then retracts the piston to draw an additional volume for a fixed number of motor steps, and then reverses the motor to extend the piston the same number of motor steps, thus leaving in the tip 14 the selected volume of liquid. The purpose of the motor reversal is to accommodate the effect of mechanical backlash in the piston drive mechanism, as described in prior art Klein U.S. Pat. No. 4,399,711. The total selected volume can be entered in various modes into the pipettor. For example, the total volume can be selected, and then the number of aliquots can be entered, or the number of aliquots can be entered with a constant volume for each aliquot being entered, or custom or variable amounts can be entered for each aliquot. In any event, the translator in the flash memory 36 correlates the selected dispensing volume 36D or volumes to an index scale 36A which is then correlated to an empirically determined number of motor steps 36C for piston extension in order to dispense the appropriate volume.

By way of example, referring to FIG. 7, a displayed aspiration volume of 300 μl corresponds to an index value of 600, and an index value of 600 corresponds to 968 motor half steps as shown in column 36B. Therefore, the microprocessor would instruct the motor to retract 968 half steps to aspirate 300 μl into the pipet tip 14 (apart from any kind of motor reversal). Further, a selected or calculated dispense volume of 12.5 μl corresponds to an index value of 25 in FIG. 7, and an index value of 25 corresponds to 40 motor half steps in column 36C. Therefore, the microprocessor would instruct the motor to extend 40 half steps to dispense a 12.5 μl aliquot. To dispense another 12.5 μl aliquot, the volume in column 36D would be 25 (i.e., 12.5+12.5), and the corresponding values (not shown) in columns 36A and 36C would be used to determine the number of additional motor half steps that the microprocessor would instruct the motor to extend.

The battery 58 is preferably a rechargeable, long life, lithium ion battery, having a voltage of 3.6 volts and a capacity of 1050 milliamp hours. The battery preferably has an elongated cylindrical shape, and has a 2-pin connector at its top end which is plugged into the main circuit board 34. The pipettor 10 has an electrical power supply port 62 for charging the battery 58, and also preferably is adapted for stand charging, e.g., using spring connectors on its backside. As mentioned, the main circuit board 34 contains electronic components for battery charging and power management. The battery should provide for at least two to four hours of continuous pipettor use. While many types of rechargeable batteries can be used in accordance with the invention, a suitable battery can be purchased from Great Power Battery Company, Hong Kong. Preferably, the amount of remaining battery life should be indicated on the display of the pipettor 10.

The front housing member 42 is made of molded plastic polycarbonate and includes structural support and framing elements to assist in the mounting of the internal components of the pipettor 10. For example, the front housing 42 includes framing platform 64 as well as vertical support structure 66. The vertical support structure 66 is molded in a shape providing two compartments on its rear side, namely a battery compartment 68 and a wireless communications chip compartment 70. As mentioned, the battery 58 has an elongated cylindrical shape as is common. The upper end of the rechargeable battery 58 resides in the battery compartment 68 whereas its lower end is supported on the frame platform 64. Suitable electrical connection terminals are provided at the upper end of the compartment 68 as is known in the art. The motor 26 is mounted to the lower end of the platform 64. Referring in particular to FIG. 3, the upper end of the battery 58 is mounted so that it is at a height above the height of the finger hook 28, whereas the motor 26 is mounted at a height substantially below the battery 58. The battery 58 and the motor 26 provide most of the weight in the upper portion 16 of the pipettor 10. With the preferred configuration having the battery 58 mounted so that a top portion of the battery 58 is above the height of the finger hook 28, the center of gravity of the pipettor 10 resides within the palm of the user.

While the pipettor 10 is designed for on board programming, it may be desirable to establish communication between the pipettor 10 and a personal computer (PC) for various reasons. In the preferred embodiment of the invention, the pipettor 10 can be adapted to accommodate a wireless communication chip 72 such as a Bluetooth wireless communication chip. The wireless chip 72 allows communication between the pipettor 10 and a PC without cluttering lab space with wires. Preferably, a wireless component can be connected to the PC either internally or using a USB connector, but several pipettors could wirelessly communicate with a single PC. For example, typical wireless communication systems have an open field connectivity of about 300 meters. However, because wireless communication is not necessary in many pipetting applications, many users may not wish to have this feature. Therefore, in accordance with one aspect of the invention, the pipettor 10 is designed to simplify the addition of a wireless communication chip 72 to the pipettor 10, either at the factory or in the field. More specifically, the vertical support structure 66 on the front housing member 42 has compartment 70 for accommodating the wireless chip 72. A user in the field can remove the rear housing member 44 (by removing screws) and can obtain access to the battery 58 as well as the wireless chip compartment 70. At the same time, however, the vertical support structure 66 isolates the other electronic components the pipettor 10 from the user, thereby protecting the integrity of the pipettor 10. Note that the compartment 70 includes an electrical connection 74. To establish communication between the wireless communication chip 72 and the pipettor microprocessor 38.

We claim:

1. A hand-held, electronic pipettor comprising:
an elongated body adapted to be held in the hand of the user;
a touch wheel control located on a front side of the body to be operated by the user;
a run button located on the pipettor to be operated by the user;
an ejector button located on the pipettor to be operated by the user;
a dot matrix user interface display located on the front side of the pipettor above the touch wheel control,
a microprocessor; and
menu-driven software for controlling information displayed on the user interface display and for programming the microprocessor to operate the pipettor wherein at least some of the information is displayed as a menu of options;
wherein the touch wheel control comprises a circular touch pad that translates rotational movement of a thumb or finger into cursor movements on the display in order to navigate the menu-driven software.

2. A pipettor as recited in claim 1 wherein the user interface display is a multi-color display.

3. A pipettor as recited in claim 1 wherein the dot matrix user interface display measures substantially about 1.5 inches across the diagonal.

4. A pipettor as recited in claim 1 wherein the touch wheel control further comprises:
an enter button located at the center of the circular touch pad.

5. A pipettor as recited in claim 1 wherein the circular touch pad includes four selector locations, namely a back button located at the top of the circular touch pad, a purge button located at the bottom of the circular touch pad and right and left navigation buttons located at the right side and left side of the circular touch pad, respectively.

6. A pipettor as recited in claim 1 wherein the elongated body has a finger hook on the rear side of the body and the pipettor further comprises a housing member that provides structural support for internal components of the pipettor including a motor that drives a piston, and an elongated cylindrical rechargeable battery, wherein the battery is mounted in the housing member so that a top portion of the battery is above the height of the finger hook;
wherein a majority of the elongated cylindrical battery is located within the palm of the hand of a user holding the pipettor with their index finger wrapped around the housing underneath the finger hook.

7. A pipettor as recited in claim 1 wherein the electronic pipettor is adapted to include an optional wireless electronic communication capability, and the electronic pipettor includes a front housing member and a rear housing member, the front and rear housing members enclosing the internal components of the pipettor and the front housing member including a wall that physically separates a user accessible compartment for a wireless communication chip from other electronic hardware of the hand-held pipettor;
wherein the user accessible compartment for the optional wireless communication chip can be accessed by removing the rear housing member.

* * * * *